(12) United States Patent
Murray et al.

(10) Patent No.: US 12,486,039 B2
(45) Date of Patent: Dec. 2, 2025

(54) AIRCRAFT FUEL SYSTEM

(71) Applicant: General Electric Company, Schenectady, NY (US)

(72) Inventors: Michael Joseph Murray, Wyoming, OH (US); Victor Moreno Patan, Querétaro (MX); Brandon W. Miller, Middletown, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 216 days.

(21) Appl. No.: 18/316,450

(22) Filed: May 12, 2023

(65) Prior Publication Data

US 2024/0174375 A1    May 30, 2024

Related U.S. Application Data

(63) Continuation-in-part of application No. 18/059,515, filed on Nov. 29, 2022.

(51) Int. Cl.
| | |
|---|---|
| *B64D 37/32* | (2006.01) |
| *B01D 53/00* | (2006.01) |
| *B01J 19/14* | (2006.01) |
| *F02C 7/22* | (2006.01) |
| *F23R 3/28* | (2006.01) |
| *A62C 3/08* | (2006.01) |

(52) U.S. Cl.
CPC .............. *B64D 37/32* (2013.01); *B01D 53/00* (2013.01); *B01J 19/14* (2013.01); *F02C 7/22* (2013.01); *F23R 3/28* (2013.01); *A62C 3/08* (2013.01); *B01D 2257/104* (2013.01)

(58) Field of Classification Search
CPC ........ B01J 19/14; B64D 37/005; B64D 37/04; B64D 37/06; B64D 37/32; B64D 37/34; F02M 37/22; F23K 5/08; F23K 2900/05082; F23R 2900/00004
See application file for complete search history.

(56) References Cited

U.S. PATENT DOCUMENTS

| | | |
|---|---|---|
| 2,964,916 A | 12/1960 | Keeping |
| 3,590,559 A | 7/1971 | Bragg et al. |
| 4,625,701 A | 12/1986 | Bartlett et al. |
| 7,628,965 B2 | 12/2009 | Johnson et al. |
| 7,735,670 B2 | 6/2010 | Zaki et al. |
| 7,896,292 B2 | 3/2011 | Limaye et al. |

(Continued)

FOREIGN PATENT DOCUMENTS

| | | |
|---|---|---|
| FR | 3127269 A1 | 3/2023 |
| FR | 3130896 A1 | 6/2023 |

(Continued)

*Primary Examiner* — Scott J Walthour
(74) *Attorney, Agent, or Firm* — Venable LLP; Edward A. Kmett; Michele V. Frank

(57) ABSTRACT

An aircraft fuel system includes a first fuel storage tank arranged to store a first fuel, a second fuel storage tank arranged to store a reduced oxygen fuel, and a fuel tank inerting system arranged to provide a reduced oxygen gas through a fuel contained within the second fuel storage tank to generate the reduced oxygen fuel within the second fuel storage tank. The fuel tank inerting system may include a fuel tank sparging system to inject the reduced oxygen gas directly into the fuel contained within the second fuel storage tank to generate the reduced oxygen fuel.

16 Claims, 8 Drawing Sheets

(56) References Cited

U.S. PATENT DOCUMENTS

| | | |
|---|---|---|
| 9,687,773 B2 | 6/2017 | Johnson et al. |
| 10,329,027 B2 | 6/2019 | Rheaume et al. |
| 11,148,824 B2 | 10/2021 | Niergarth et al. |
| 11,420,763 B2 | 8/2022 | Niergarth et al. |
| 2017/0113807 A1 | 4/2017 | Burnell et al. |
| 2018/0118367 A1* | 5/2018 | Rheaume ............... B64D 37/32 |
| 2019/0389593 A1 | 12/2019 | Emerson et al. |
| 2020/0140113 A1* | 5/2020 | Niergarth .................. F02C 7/22 |
| 2020/0269991 A1 | 8/2020 | Niergarth et al. |
| 2022/0106053 A1 | 4/2022 | Snyder |
| 2022/0332431 A1 | 10/2022 | Niergarth et al. |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |

\* cited by examiner

AIRCRAFT FUEL SYSTEM

RELATED APPLICATION

This application is a continuation-in-part of U.S. patent application Ser. No. 18/059,515, filed on Nov. 29, 2022.

TECHNICAL FIELD

The present disclosure relates to an aircraft fuel system.

BACKGROUND

Conventionally, an aircraft includes a fuel system, including a fuel tank. In some aircraft, a fuel tank inerting system may be included. The fuel tank inerting system may be provided with bleed air from a compressor of a gas turbine engine, and the bleed air is processed through the fuel tank inerting system to generate nitrogen enhanced air (NEA). The nitrogen enhanced air may then be provided to an ullage of the fuel tank. In other aircraft, a fuel oxygen reduction system may be included, where fuel in the fuel tank is processed by the fuel oxygen reduction system to obtain an oxygen reduced fuel that is provided directly to the engine. The fuel oxygen reduction system may also process oxygen rich gas from the ullage of the fuel tank and return deoxygenated (or reduced oxygen) gas back to the ullage of the fuel tank.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
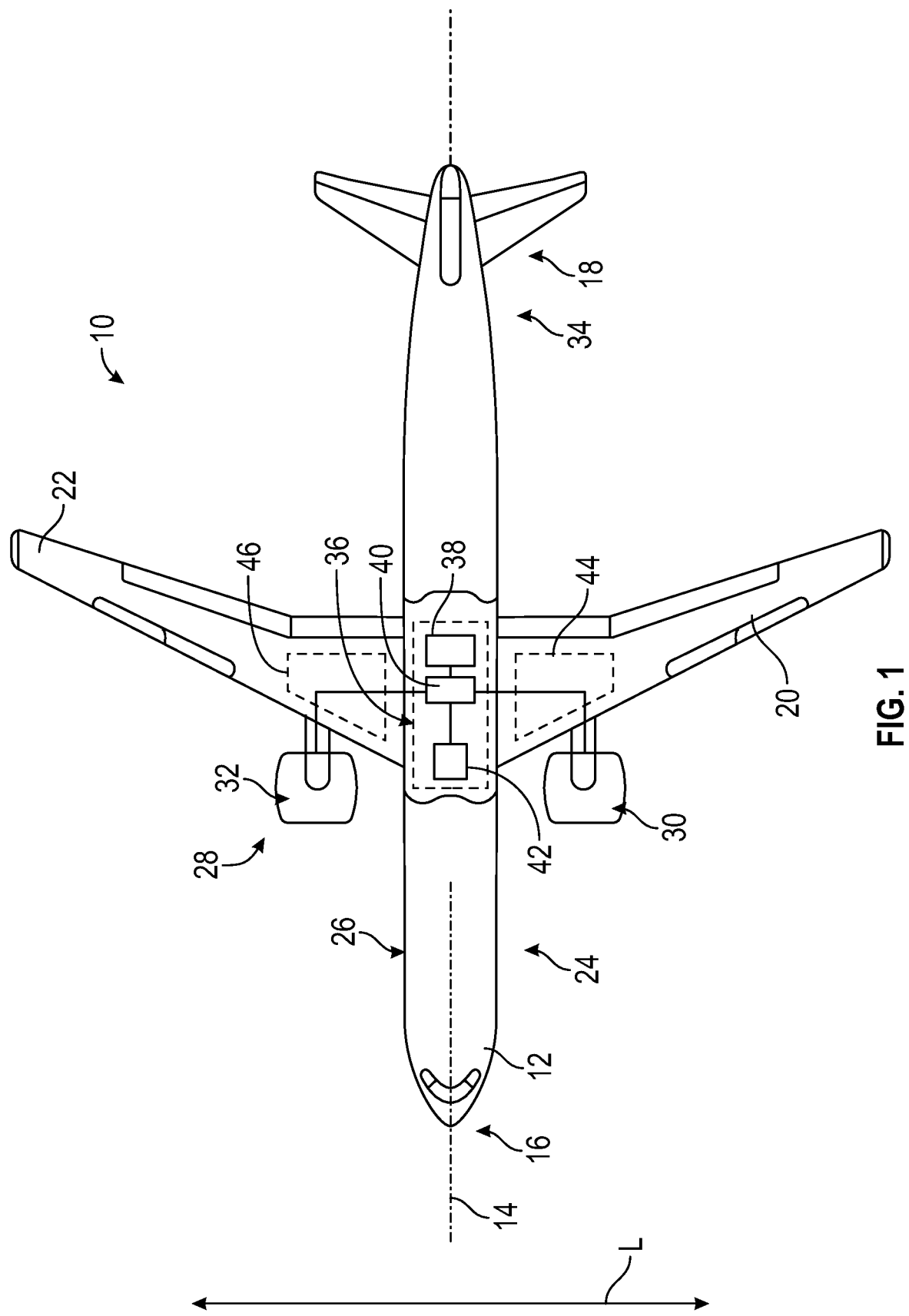
FIG. 1 depicts a top partial cut-away view of an exemplary aircraft, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," or "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Conventionally, an aircraft includes a fuel system, including a fuel tank. In some aircraft, a fuel tank inerting system may be included. The fuel tank inerting system may be provided with bleed air from a compressor of a gas turbine engine, and the bleed air is processed through the fuel tank inerting system to generate nitrogen enhanced air (NEA). The nitrogen enhanced air may then be provided to an ullage of the fuel tank. The fuel tank inerting system may help to reduce an amount of oxygen in the ullage of the fuel tank so as to reduce volatility of an otherwise oxygen enriched gas within the ullage. However, such a system does not reduce an amount of oxygen within the fuel in the fuel tank.

In other aircraft, a fuel oxygen reduction system may be included, where the fuel in the fuel tank is processed by the fuel oxygen reduction system to obtain an oxygen reduced fuel that is provided directly to the engines. In addition, the fuel oxygen reduction system may also process oxygen rich gas from the ullage of the fuel tank and return reduced oxygen gas back to the ullage of the fuel tank. However, such a system may be subject to processing variations due to different quantity flows of fuel required by the engines throughout different operating conditions. As a result, the fuel oxygen reduction system may not be able to process the fuel in the fuel tank efficiently and may either process the fuel too slowly or may process more fuel than what is needed for the varying engine operating conditions.

The present disclosure addresses the foregoing by providing an aircraft fuel system that includes a first fuel storage tank arranged to store a first fuel and a second fuel storage tank that is arranged to store deoxygenated fuel, and to provide the deoxygenated fuel to the engines. The first and second fuel storage tanks may be separate fuel tanks, or may be separate divided portions of the same fuel tank. A fuel oxygen reduction unit may be included to generate the deoxygenated fuel from the first fuel and to provide the deoxygenated fuel to the second fuel storage tank. In addition, a fuel tank inerting system may also be included so as to operate in conjunction with the fuel oxygen reduction unit to provide a reduced oxygen gas to an ullage of at least one of the first fuel storage tank and/or the second fuel storage tank. As a result, the deoxygenated fuel generated by the fuel oxygen reduction unit can be stored in the second fuel storage tank so as to more reliably meet the fuel demands of the engines through all of the varying operating conditions. The fuel oxygen reduction unit and/or the fuel tank inerting system can also process the oxygen rich gas in the ullage of the first fuel storage tank and provide reduced oxygen gas to the ullage of the first fuel storage tank, and also the ullage of the second fuel storage tank. As a result, the oxygen level within the ullage of both fuel tanks can be maintained at a reduced oxygen level so as to reduce the potential of a fire within the fuel tanks.

Referring now to the drawings, FIG. 1 depicts a top partial cut-away view of an exemplary aircraft 10 in which various aspects of the present disclosure may be implemented. The aircraft 10 defines a longitudinal centerline 14 that extends therethrough, a vertical direction (extending into and out of the figure), a lateral direction L, a forward end 16, and an aft end 18. The aircraft 10 includes a fuselage 12, extending longitudinally from the forward end 16 of the aircraft 10 towards the aft end 18 of the aircraft 10, a port wing 20, and a starboard wing 22. The port wing 20 extends laterally outward and aft with respect to the longitudinal centerline 14 from a port side 24 of the fuselage 12. The starboard wing 22 extends laterally outwardly and aft with respect to the longitudinal centerline 14 from a starboard side 26 of the fuselage 12. The aircraft 10 may include a propulsion system 28 that includes a port engine 30 that may be mounted to the port wing 20, and includes a starboard engine 32 that may be mounted to the starboard wing 22. The propulsion system 28 may include fuel system 36, which will be described in more detail below. While FIG. 1 depicts two engines implemented in the aircraft 10, more than two engines may be implemented instead. In addition, while FIG. 1 depicts the port engine 30 mounted to the port wing 20 and the starboard engine 32 mounted to the starboard wing 22, the engines could be mounted in any of various other locations on the aircraft 10, such as within the port wing 20 and within the starboard wing 22, or at a tail end 34 of the fuselage 12. Each of the port engine 30 and the starboard engine 32 may be a ducted fan gas turbine engine, as one example, although other types of engines may also be implemented instead, including an unducted fan turbine engine.

The propulsion system 28 includes the fuel system 36 that includes at least one fuel tank that stores a fuel that is provided to each of the port engine 30 and the starboard engine 32. In FIG. 1, the fuel system 36 is seen to include a first fuel storage tank 38, a second fuel storage tank 40, and a fuel oxygen reduction unit 42. The first fuel storage tank 38 may be considered as a main fuel tank that stores a first fuel (e.g., an oxygenated fuel), while the second fuel storage tank 40 may be considered as a secondary fuel tank that, as will be described below, stores a deoxygenated fuel that is provided to each of the port engine 30 and to the starboard engine 32. The fuel oxygen reduction unit 42 is configured to receive the first fuel from the first fuel storage tank 38, to reduce an oxygen content of the first fuel, and to provide a reduced oxygen fuel (i.e., a deoxygenated fuel) to the second fuel storage tank 40, to the port engine 30, and to the starboard engine 32. The fuel oxygen reduction unit 42 is further configured to reduce an oxygen content of a gas within an ullage (described below) of the first fuel storage tank 38 and to provide a reduced oxygen gas to the ullage of the first fuel storage tank 38. Thus, as used herein, the term "fuel oxygen reduction unit" may generally mean a device capable of reducing a free oxygen content of the fuel and the gas from within a fuel storage tank, and to provide a reduced oxygen content fuel and/or gas to a fuel storage tank.

Additional fuel storage tanks may be included in the aircraft 10, including at least one port wing fuel storage tank 44 that is arranged within the port wing 20, and at least one starboard wing fuel storage tank 46 that is arranged within the starboard wing 22. Each of the port wing fuel storage tank 44 and the starboard wing fuel storage tank 46 may generally be similar to the first fuel storage tank 38 and be in fluid communication with the fuel oxygen reduction unit 42. Alternatively, multiple fuel systems 36 may be included in the aircraft 10, including separate fuel systems 36 in each of the port wing 20 and the starboard wing 22. In this case, the port wing fuel storage tank 44 may function in the same manner as the first fuel storage tank 38 for a fuel system 36 provided in the port wing 20, and the starboard wing fuel storage tank 44 may function in the same manner as the first fuel storage tank 38 for a fuel system in the starboard wing 22.

Figure 2:
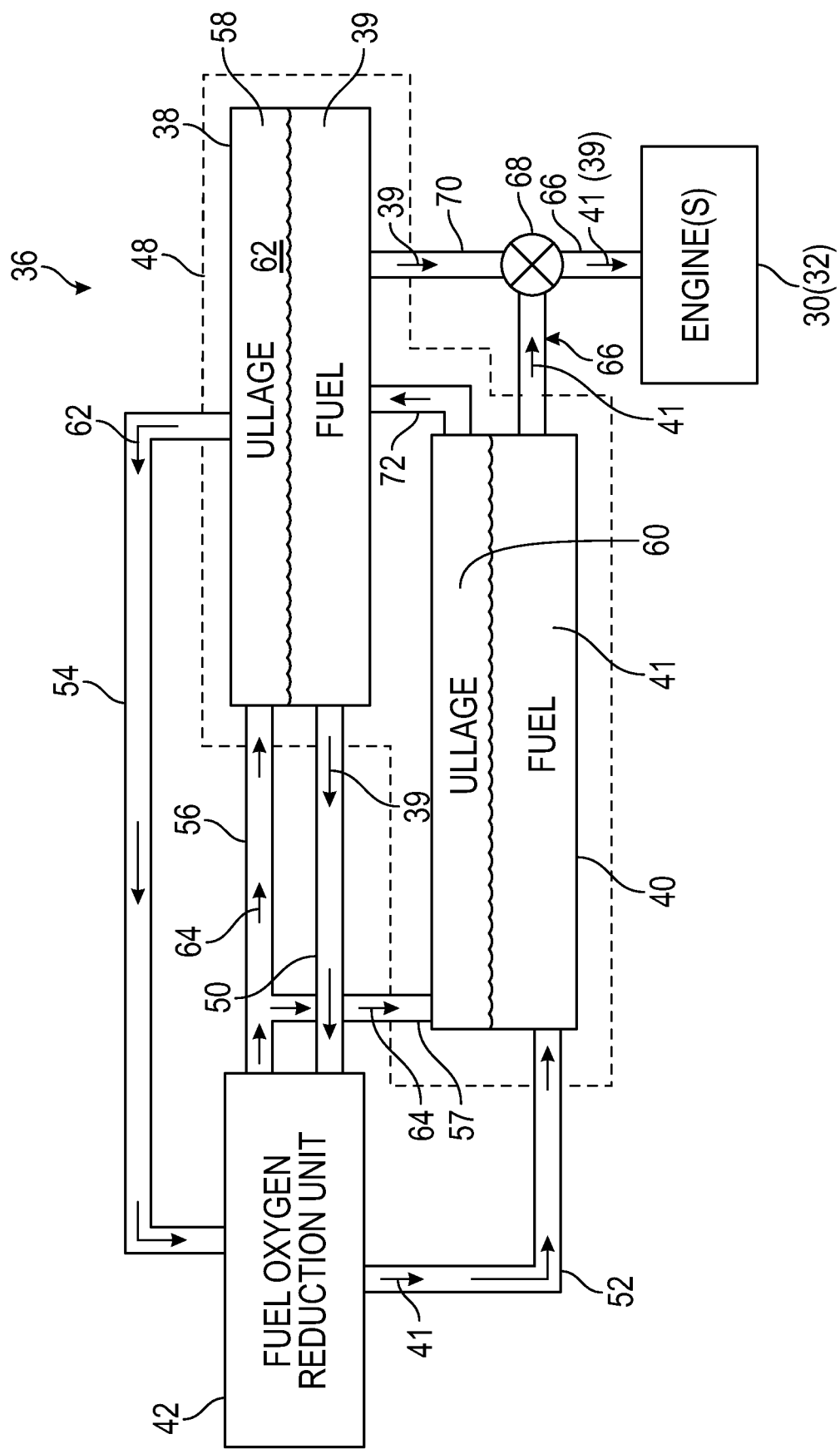
FIG. 2 is a schematic diagram of an exemplary fuel system 36 as may be incorporated into the aircraft 10 of FIG. 1.

FIG. 2 is a schematic diagram of an exemplary fuel system 36 as may be incorporated into the aircraft 10 of FIG. 1. As was briefly described above with regard to FIG. 1, the fuel system 36 includes the first fuel storage tank 38, which is arranged to store a first fuel 39, the second fuel storage tank 40, which is arranged to store a deoxygenated fuel 41, and the fuel oxygen reduction unit 42, which is arranged to generate the deoxygenated fuel 41 from the first fuel 39. While FIG. 2 depicts the first fuel storage tank 38 and the second fuel storage tank 40 as constituting separate fuel storage tanks, the first fuel storage tank 38 and the second fuel storage tank 40 may be combined in a single fuel storage tank 48 that is divided into separate fuel tank portions.

The fuel system 36 generally includes a plurality of fluid (fuel) supply lines and gas (air) supply lines between the first fuel storage tank 38, the second fuel storage tank 40, the fuel oxygen reduction unit 42, and the engines 30, 32. As shown in FIG. 2, a first fuel supply line 50 provides fluid communication from the first fuel storage tank 38 to the fuel oxygen reduction unit 42, and a second fuel supply line 52 provides fluid communication from the fuel oxygen reduction unit 42 to the second fuel storage tank 40. A first gas supply line 54 provides airflow communication from an ullage 58 of the first fuel storage tank 38 to the fuel oxygen reduction unit 42, and a first gas return line 56 provides an airflow communication from the fuel oxygen reduction unit 42 to the ullage 58 of the first fuel storage tank 38. In addition, as an alternative, the first gas return line 56 may further include a branch gas return line 57 that provides airflow communication from the fuel oxygen reduction unit 42 to an ullage 60 of the second fuel storage tank 40. With the foregoing arrangement, the first fuel supply line 50 provides the first fuel 39 to the fuel oxygen reduction unit 42, the second fuel supply line 52 provides the deoxygenated fuel 41 to the second fuel storage tank 40, the first gas supply line 54 provides an oxygen rich gas 62 from the ullage 58 of the first fuel storage tank 38 to the fuel oxygen reduction unit 42, and the first gas return line 56 provides a deoxygenated gas 64 (which may also be referred to herein as a "reduced oxygen gas") to the ullage 58 of the first fuel storage tank 38, and, alternatively, the branch gas return line 57 provides the deoxygenated gas 64 to the ullage 60 of the second fuel storage tank 40. The generation of the deoxygenated fuel 41 and the deoxygenated gas 64 by the fuel oxygen reduction unit 42 will be described in more detail below. While not shown in FIG. 2, a fuel pump may be provided to assist in pumping the first fuel 39 through the fuel oxygen reduction unit 42 and to pump the deoxygenated fuel 41 to the second fuel storage tank 40. Additionally, an ullage pump (not shown) may be provided to assist in pumping the oxygen rich gas 62 from the ullage 58 through the fuel oxygen reduction unit 42.

An engine fuel supply line 66 provides the deoxygenated fuel 41 from the second fuel storage tank 40 to the port engine 30 and to the starboard engine 32. A fuel pump (not shown) may also be provided to pump the deoxygenated fuel 41 from the second fuel storage tank 40 through the engine fuel supply line 66 to the port engine 30 and to the starboard engine 32.

A fault accommodation fuel supply line 70 may be included to provide the first fuel 39 to a valve 68 within the engine fuel supply line 66. In the event of a failure in the fuel system such that the deoxygenated fuel 41 cannot be provided to the engine fuel supply line 66 (e.g., where the fuel oxygen reduction unit 42 fails to generate the deoxygenated fuel 41 to sufficiently fill the second fuel storage tank 40), the valve 68 may be switched to allow a flow of the first fuel 39 to flow from the first fuel storage tank 38 to the engines 30, 32.

In addition, an overflow fuel supply line 72 may provide fluid communication between the second fuel storage tank 40 and the first fuel storage tank 38 so that, in the event of an overfill of the deoxygenated fuel 41 within the second fuel storage tank 40, excess deoxygenated fuel 41 can be provided back to the first fuel storage tank 38.

During operation, as will be described in more detail below, the fuel oxygen reduction unit 42 is generally arranged to receive the flow of oxygen rich gas 62 from the ullage 58 of the first fuel storage tank 38 and the flow of the first fuel 39 from the first fuel storage tank 38, and to reduce an oxygen content of each. The fuel oxygen reduction unit 42 is also arranged to provide a relatively low oxygen content deoxygenated gas 64 back to the ullage 58 of the first fuel storage tank 38, and, alternatively, to the ullage 60 of the second fuel storage tank 40, and to provide the relatively low oxygen content deoxygenated fuel 41 to the second fuel storage tank 40. By reducing an oxygen content of the vapor/air/gas in the ullage 58 and, alternatively, in the ullage 60, a risk of flame-ups or fires within the tanks in the case of a spark may be reduced. Further, by reducing an oxygen content of the first fuel 39 to generate the deoxygenated fuel 41 that is provided to the port engine 30 and to the starboard engine 32, an increased amount of heat may be added thereto with reduced risk of coking (allowing for increased efficiencies in the combustion process and providing an effective heat sink).

Figure 3:
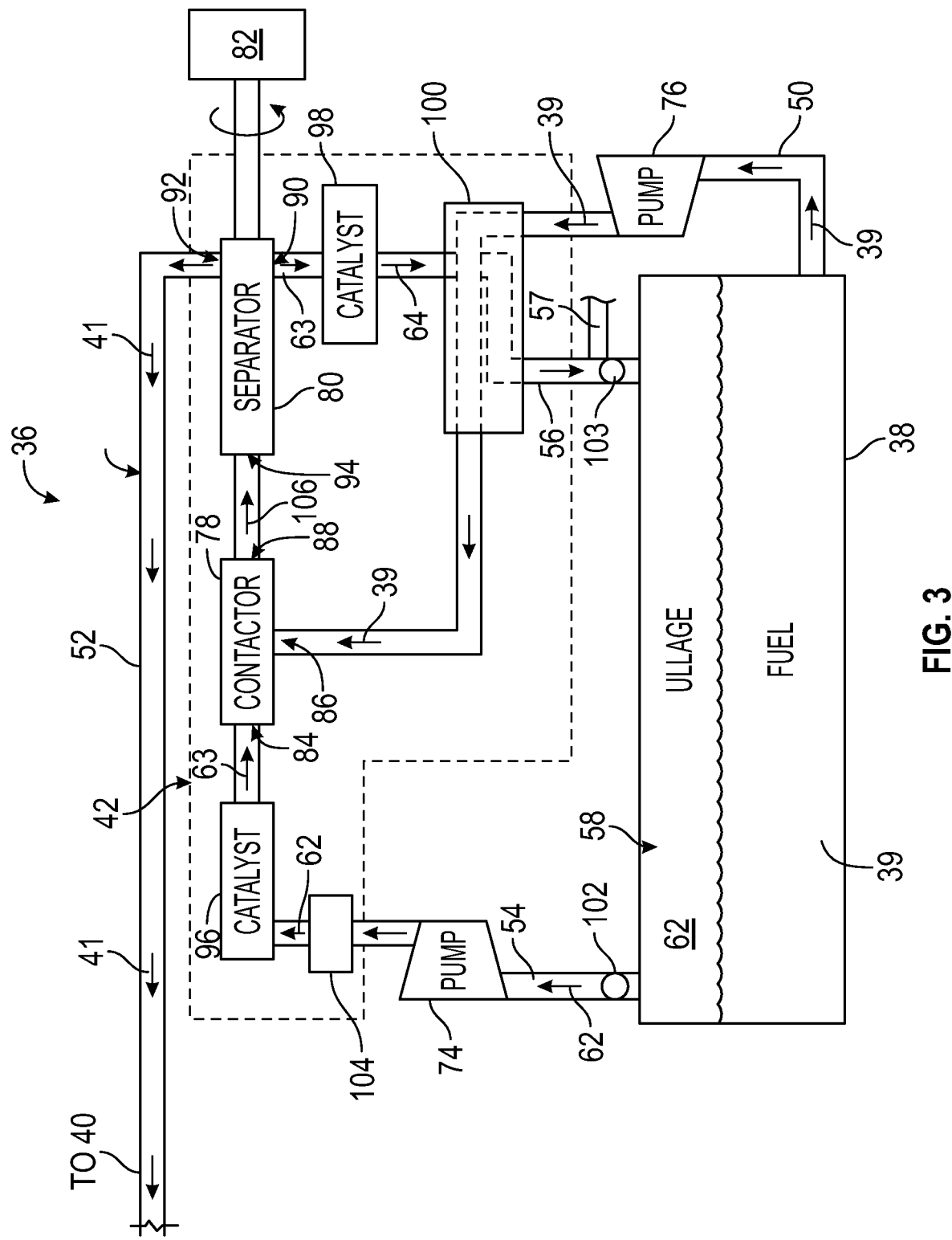
FIG. 3 is a schematic diagram depicting a detailed view of a fuel oxygen reduction unit, according to an aspect of the present disclosure.

FIG. 3 is a schematic diagram depicting a detailed view of the fuel oxygen reduction unit 42, according to an aspect of the present disclosure. FIG. 3 depicts a flow between the first fuel storage tank 38 and the fuel oxygen reduction unit 42. In order to assist with the flow of the oxygen rich gas 62 from the ullage 58 of the first fuel storage tank 38, an ullage pump 74 is provided in airflow communication with the ullage 58 in the first gas supply line 54. Similarly, in order to assist with the flow of the first fuel 39 from the first fuel storage tank 38, a fuel pump 76 is provided in fluid communication with the first fuel 39 in the first fuel supply line 50. The fuel oxygen reduction unit 42 generally includes a contactor 78 and a fuel/gas separator 80. The fuel/gas separator 80 is a mechanically-driven fuel/gas separator 80 mechanically coupled to, and driven by, a power source 82. The power source 82 driving the fuel/gas separator 80 may be any suitable power source, such as an electric motor, a hydraulic motor, a pneumatic motor, a combustion engine, a power source shared with other components, etc. As will be explained in more detail below, the contactor 78 generally defines a gas inlet 84, a liquid fuel inlet 86, and a fuel/gas mixture outlet 88. Further, the fuel/gas separator 80 generally defines a gas outlet 90, a liquid fuel outlet 92, and a fuel/gas mixture inlet 94. The gas inlet 84 of the contactor 78 is in airflow communication with the first gas supply line 54, the liquid fuel inlet 86 of the contactor 78 is fluidly connected to the fuel pump 76, and the fuel/gas mixture outlet 88 of the contactor 78 is fluidly coupled to the fuel/gas mixture inlet 94 of the fuel/gas separator 80. Further, the gas outlet 90 of the fuel/gas separator 80 is in airflow communication with the first gas return line 56, and the liquid fuel outlet 92 of the fuel/gas separator 80 is fluidly connected with the second fuel supply line 52.

The fuel oxygen reduction unit 42 depicted in FIG. 3 further includes a first catalyst 96 and a second catalyst 98. The first catalyst 96 is positioned within the first gas supply line 54 at a location upstream of the contactor 78 (and downstream of the ullage 58), and the second catalyst 98 is positioned at a location downstream of the fuel/gas separator 80 (and upstream of the ullage 58).

Further, the fuel oxygen reduction unit 42 depicted in FIG. 3, additionally includes a heat exchanger 100. The heat exchanger 100 is positioned in thermal communication with, and, more specifically, in airflow communication with, the first gas return line 56 at a location downstream of the second catalyst 98, and upstream of the ullage 58. Further, the heat exchanger 100 is in thermal communication, or, more specifically, flow communication, with the first fuel supply line 50, such that the first fuel 39 flowing therethrough, may accept heat from the flow of the deoxygenated gas 64 through the first gas return line 56 downstream of the second catalyst 98. Thus, a temperature of the deoxygenated gas 64 flowing into the ullage 58 of the first fuel storage tank 38 may be reduced.

During typical operations, the oxygen rich gas 62 is urged through the first gas supply line 54 by the ullage pump 74, and across an upstream flame arrester 102. The upstream flame arrester 102 may be configured to prevent a flame from crossing into the first fuel storage tank 38 from the first gas supply line 54, or vice versa. The oxygen rich gas 62 flows from the ullage pump 74 through a pre-heater 104 and into the first catalyst 96. The pre-heater 104 may be an electrical resistance heater, a heat exchanger thermally coupled with another system (not shown), or any other suitable heat source for increasing a temperature of the oxygen rich gas 62. The pre-heater 104 may be configured to increase a temperature of the oxygen rich gas 62 to, or above, an activation temperature of the first catalyst 96 (e.g., a minimum light off temperature of the first catalyst 96 that allows the first catalyst 96 to operate properly). Although the pre-heater 104 is depicted as a separate component from the first catalyst 96, the pre-heater 104 may be integrated into the first catalyst 96.

Further, within the first catalyst 96, the oxygen content of the oxygen rich gas 62 is reduced. More specifically, within the first catalyst 96, the relatively oxygen rich gas 62 may be reacted to reduce the oxygen content thereof. However, the first catalyst 96 may be configured in any suitable manner to reduce an oxygen content of the oxygen rich gas 62. For example, the first catalyst 96 may be configured to react with the oxygen rich gas 62 with elements inside the first catalyst 96 to provide a relatively oxygen-free deoxygenated gas 63 upon exit. For example, the first catalyst 96 may include geometries of catalytic components through which the oxygen rich gas 62 flows to reduce an oxygen content thereof. Such reaction may utilize at least in part a fuel content of the oxygen rich gas 62 present by virtue of the oxygen rich gas 62 originating in the first fuel storage tank 38 (i.e., being in contact with the first fuel 39 therein). The first catalyst 96 may be configured to reduce an oxygen content of the deoxygenated gas 63 to less than about three percent (3%) oxygen ($O_2$) by mass, or less than about one percent (1%) oxygen ($O_2$) by mass.

From the first catalyst 96, the deoxygenated gas 63 is provided to the gas inlet 84 of the contactor 78. Simultaneously, the first fuel 39 is urged by the fuel pump 76 from the first fuel storage tank 38 through the first fuel supply line 50. From the fuel pump 76, the first fuel 39 flows through the heat exchanger 100, where the first fuel 39 may accept heat from the flow of deoxygenated gas 64 through the first gas return line 56. From the heat exchanger 100, the first fuel 39 flows to the liquid fuel inlet 86 of the contactor 78. Within the contactor 78, the deoxygenated gas 63 received through the gas inlet 84 is mixed with the flow of the first fuel 39 received through the liquid fuel inlet 86 to generate a fuel/gas mixture 106. The fuel/gas mixture 106 generated within the contactor 78 is provided to the fuel/gas mixture inlet 94 of the fuel/gas separator 80.

Generally, during operation of the fuel oxygen reduction unit 42, the first fuel 39 provided through the first fuel supply line 50 to the contactor 78 may have a relatively high oxygen content. By contrast, the deoxygenated gas 63 provided to the contactor 78 may have a relatively low oxygen content or other specific chemical structure. Within the contactor 78, the first fuel 39 is mixed with the deoxygenated gas 63, resulting in the fuel/gas mixture 106. As a result of the mixing, a physical exchange may occur where at least a portion of the oxygen within the first fuel 39 is transferred to the deoxygenated gas 63, such that the fuel component of the fuel/gas mixture 106 has a relatively low oxygen content (as compared to the first fuel 39 provided through the first fuel supply line 50) and the deoxygenated gas 63 component of the fuel/gas mixture 106 has a relatively high oxygen content (as compared to the deoxygenated gas 63 provided through the first gas supply line 54 to the contactor 78).

As was discussed above, the fuel/gas separator 80 is configured as a mechanically-driven fuel/gas separator 80, or, more specifically, as a rotary/centrifugal fuel/gas separator 80. Accordingly, the fuel/gas separator 80 may include a mechanically rotatable separator assembly (not shown) that, in operation, may generally force heavier liquid fuel outward and lighter gas inward through a filter. The liquid fuel may then exit through the liquid fuel outlet 92 of the fuel/gas separator 80 and a deoxygenated gas 63' may exit through the gas outlet 90 of the fuel/gas separator 80. Accordingly, the liquid fuel provided to the liquid fuel outlet 92, having interacted with the deoxygenated gas 63, may have a relatively low oxygen content. The liquid fuel from the liquid fuel outlet 92 of the fuel/gas separator 80 is provided through the second fuel supply line 52 to the second fuel storage tank 40 (FIG. 2). The deoxygenated gas 63' is to be returned to the ullage 58, i.e., downstream of the fuel/gas separator 80. By virtue of mixing with the liquid first fuel 39, the deoxygenated gas 63' may now have a relatively high oxygen content compared to the deoxygenated gas 63 provided to the contactor 78 at the gas inlet 84. Accordingly, the fuel oxygen reduction unit 42 may further include the second catalyst 98. The deoxygenated gas 63' from the gas outlet 90 of the fuel/gas separator 80 is provided to the second catalyst 98, wherein an oxygen content of the deoxygenated gas 63' is further reduced to produce the deoxygenated gas 64. The second catalyst 98 is positioned in airflow communication with the first gas return line 56 to reduce the oxygen content of deoxygenated gas 63' prior to returning the deoxygenated gas 64 to the ullage 58 of the first fuel storage tank 38. The second catalyst 98 may operate in a manner similar to the operations described above with reference to the first catalyst 96. The second catalyst 98 may better ensure that the deoxygenated gas 64 returned to the ullage 58 has a desired relatively low oxygen content.

Referring still to FIG. 3, the deoxygenated gas 64 passing through the first gas return line 56 is further cooled downstream of the second catalyst 98 through the heat exchanger 100. The heat exchanger 100 is a gas-to-liquid heat exchanger configured to transfer heat from the deoxygenated gas 64 through the first gas return line 56 to a heat exchange fluid, and, more specifically, to the first fuel 39 flowing through the first fuel supply line 50. Thus, the heat exchanger 100 may reduce a temperature of the deoxygenated gas 64 through the first gas return line 56, and may increase a temperature of the first fuel 39 through the first fuel supply line 50. The resulting cooled and relatively low oxygen content deoxygenated gas 64 is then provided back to the ullage 58 of the first fuel storage tank 38, and, alternatively, to the second fuel storage tank 40. A downstream flame arrestor 103, similar to the upstream flame arrester 102, may be provided in the first gas return line 56. While not shown in FIG. 3, a flame arrestor may also be included in the branch gas return line 57 at the ullage 60 (FIG. 2) of the second fuel storage tank 40.

Figure 4:
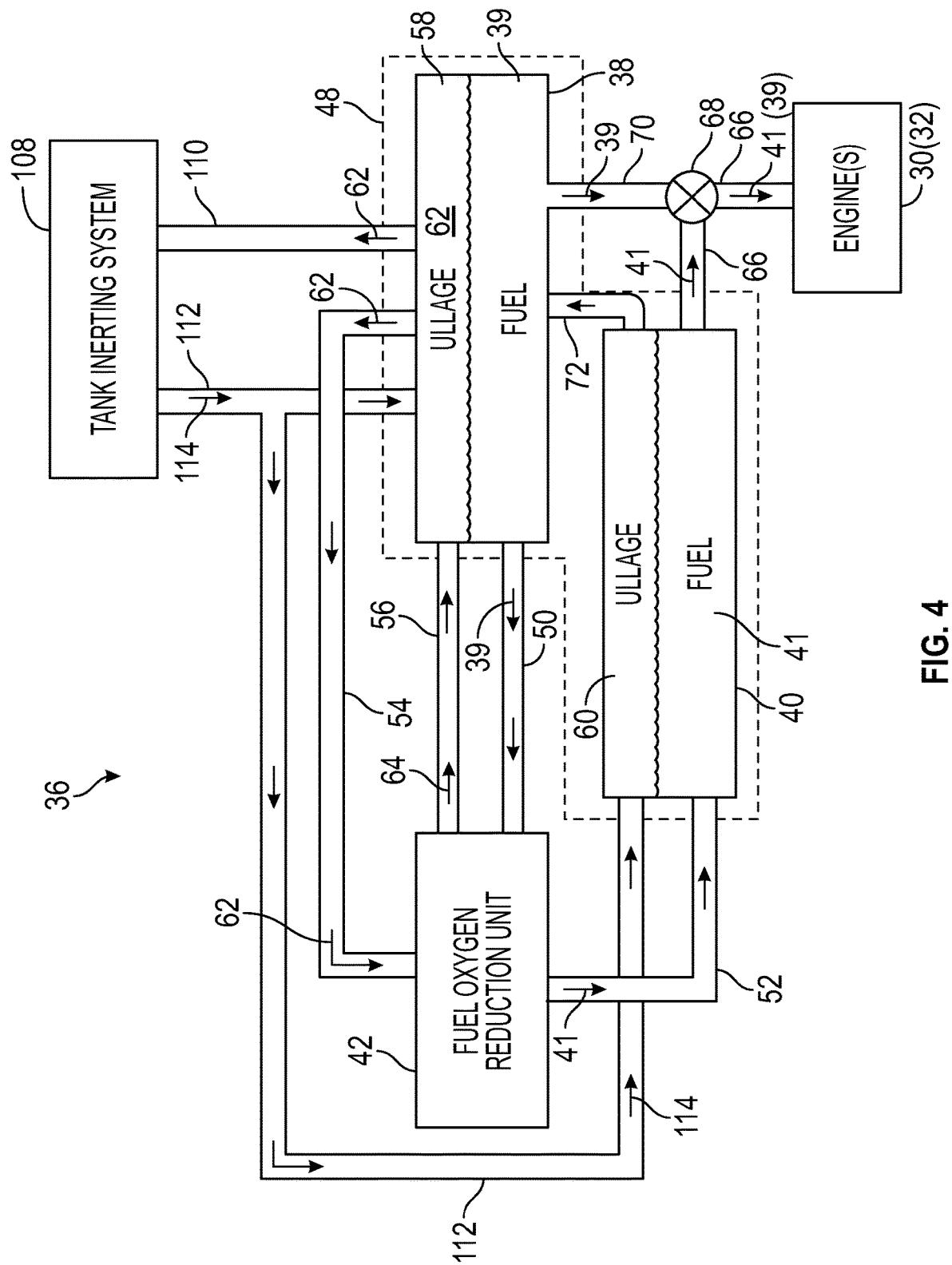
FIG. 4 is a schematic diagram of an alternate arrangement of a fuel system 36 according to another aspect of the present disclosure.

FIG. 4 is a schematic diagram of an alternate arrangement of a fuel system 36 according to another aspect of the present disclosure. The fuel system 36 in FIG. 4 includes elements that are the same as those described above with regard to FIG. 2 and, therefore, the same elements are labeled accordingly. In the FIG. 4 aspect, however, a fuel tank inerting system 108 is incorporated with the fuel system 36 that was described for FIG. 2. The fuel tank inerting system 108 may be any known type of fuel tank inerting system, such as an inerting system that utilizes a membrane gas separator, which may also be referred to as an air separation module, and which may produce nitrogen enriched air (NEA) that is provided to the fuel tank as an inerting gas. In the FIG. 4 aspect, a second gas supply line 110 provides airflow communication from the ullage 58 of the first fuel storage tank 38 to the fuel tank inerting system 108. The second gas supply line 110 provides the oxygen rich gas 62 from the ullage 58 of the first fuel storage tank 38 to the fuel tank inerting system 108. A second gas return line 112 provides airflow communication from the fuel tank inerting system 108 to the ullage 58 of the first fuel storage tank 38, and to the ullage 60 of the second fuel storage tank 40. The second gas return line 112 provides a reduced oxygen gas 114 (e.g., the NEA) to the ullage 58 of the first fuel storage tank 38 and to the ullage 60 of the second fuel storage tank 40. Thus, in the FIG. 4 aspect, the fuel oxygen reduction unit 42 provides the deoxygenated fuel 41 to the second fuel storage tank 40, while the fuel tank inerting system 108 provides the reduced oxygen gas 114 to the ullage 60 of the second fuel storage tank 40. In the same manner as in the FIG. 2 aspect, in the FIG. 4 aspect, the fuel oxygen reduction unit 42 provides the deoxygenated gas 64 to the ullage 58 of the first fuel storage tank 38, and the fuel tank inerting system 108 also provides the reduced oxygen gas 114 to the ullage 58 of the first fuel storage tank 38. As a result, since the fuel tank inerting system 108 provides the reduced oxygen gas 114 to the first fuel storage tank 38, it may be possible to omit the second catalyst 98 and the heat exchanger 100 (FIG. 3) from the fuel oxygen reduction unit 42 and still provide sufficient inert gas to the ullage 58. Omitting the second catalyst 98 would further reduce the potential for a fire within the fuel tank since the higher temperature operation of the second catalyst 98 would be removed from the fuel system.

Figure 5:
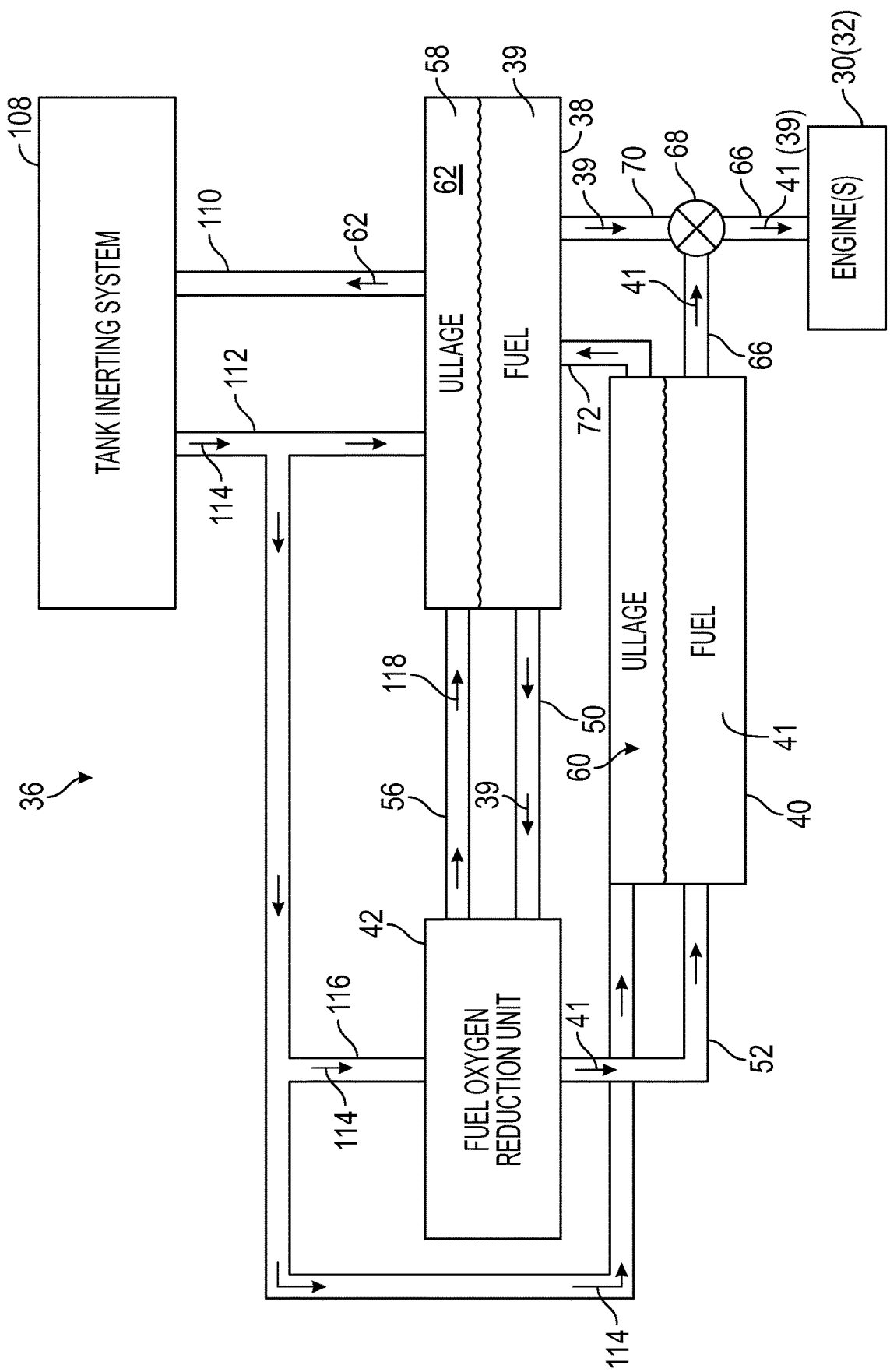
FIG. 5 is a schematic diagram of another alternate arrangement of a fuel system, according to an aspect of the present disclosure.

FIG. 5 is a schematic diagram of another alternate arrangement of a fuel system 36, according to an aspect of the present disclosure. The fuel system 36 in FIG. 5 includes elements that are the same as those described above with regard to FIG. 4 and, therefore, the same elements are labeled accordingly. In the FIG. 5 aspect, however, the first gas supply line 54 is omitted and the second gas return line 112 further provides a flow of the reduced oxygen gas 114 to the fuel oxygen reduction unit 42 via a branch gas supply line 116. As will be described below with regard to FIG. 6, the fuel oxygen reduction unit 42 may include a different internal arrangement than that shown in FIG. 3, and, as a result, the first gas return line 56 may provide an oxygen rich return gas 118 rather than the deoxygenated gas 64 as a return gas to the ullage 58 of the first fuel storage tank 38.

Figure 6:
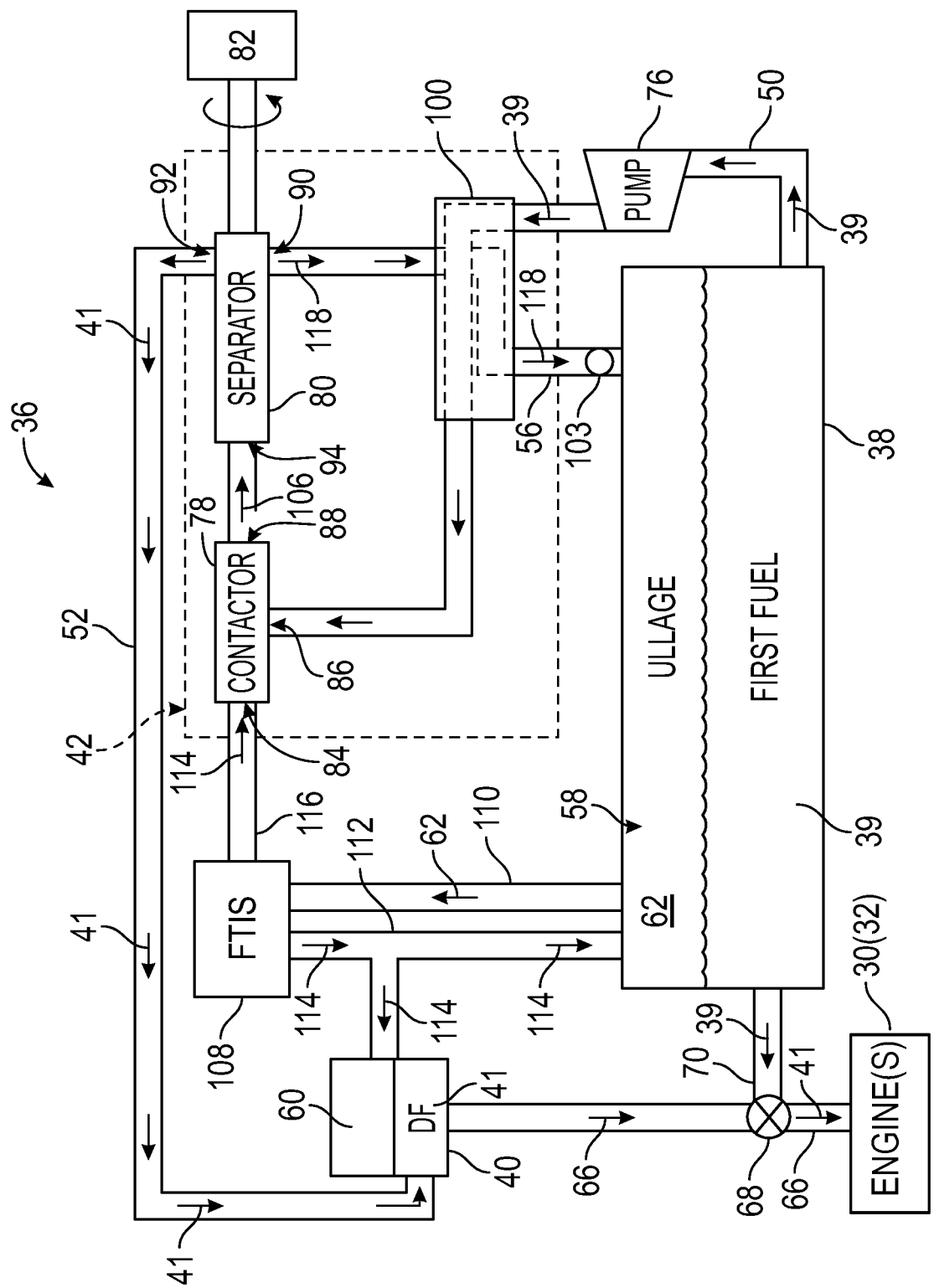
FIG. 6 is a schematic diagram depicting a detailed view of an alternate fuel oxygen reduction unit that may implemented in the fuel system of FIG. 5, according to an aspect of the present disclosure.

FIG. 6 is a schematic diagram depicting a detailed view of an alternate fuel oxygen reduction unit 42 that may be implemented in the fuel system 36 of the FIG. 5 aspect. The alternate fuel oxygen reduction unit 42 in FIG. 6 includes elements that are the same as those described above with regard to FIG. 3 and, therefore, the same elements are labeled accordingly. In the fuel oxygen reduction unit 42 of the FIG. 6 aspect, when compared with the FIG. 3 aspect, several elements may be omitted, including the pre-heater 104, the first catalyst 96, the second catalyst 98, the heat exchanger 100, and the ullage pump 74. In the FIG. 6 aspect, however, the fuel tank inerting system 108 is implemented, and similar to the FIG. 5 aspect, the branch gas supply line 116 is connected with the fuel oxygen reduction unit 42 and is connected to the gas inlet 84 of the contactor 78, whereby the reduced oxygen gas 114 is provided from the fuel tank inerting system 108 to the contactor 78. The contactor 78 and the fuel/gas separator 80 function in the same manner described above with regard to FIG. 3. As was discussed above for FIG. 3, as a result of the mixing in the contactor 78, a physical exchange may occur where at least a portion of the oxygen within the first fuel 39 is transferred to the reduced oxygen gas 114, such that the fuel component of the fuel/gas mixture 106 has a relatively low oxygen content (as compared to the first fuel 39 provided through the first fuel supply line 50) and the reduced oxygen gas 114 component of the fuel/gas mixture 106 has a relatively high oxygen content (as compared to the reduced oxygen gas 114 provided through the second gas return line 112 to the contactor 78). Thus, the oxygen rich return gas 118 from the fuel/gas separator 80 may be higher in oxygen content than the deoxygenated gas 64, but may also be lower in oxygen content than the oxygen rich gas 62 within the ullage 58. The fuel tank inerting system 108, however, provides the required reduced oxygen gas 114 to the ullage 58 of the first fuel storage tank 38 to reduce the risk of a fire. In addition, the omission of the pre-heater 104, the first catalyst 96, the second catalyst 98, and the heat exchanger 100 from the fuel oxygen reduction unit 42 simplifies the construction of the fuel oxygen reduction unit 42, and also removes various heat sources from the fuel oxygen reduction unit 42 that may otherwise increase the risk of heat exposure to the first fuel 39, and, thereby, increase the risk of a fire within the fuel system 36.

Figure 7:
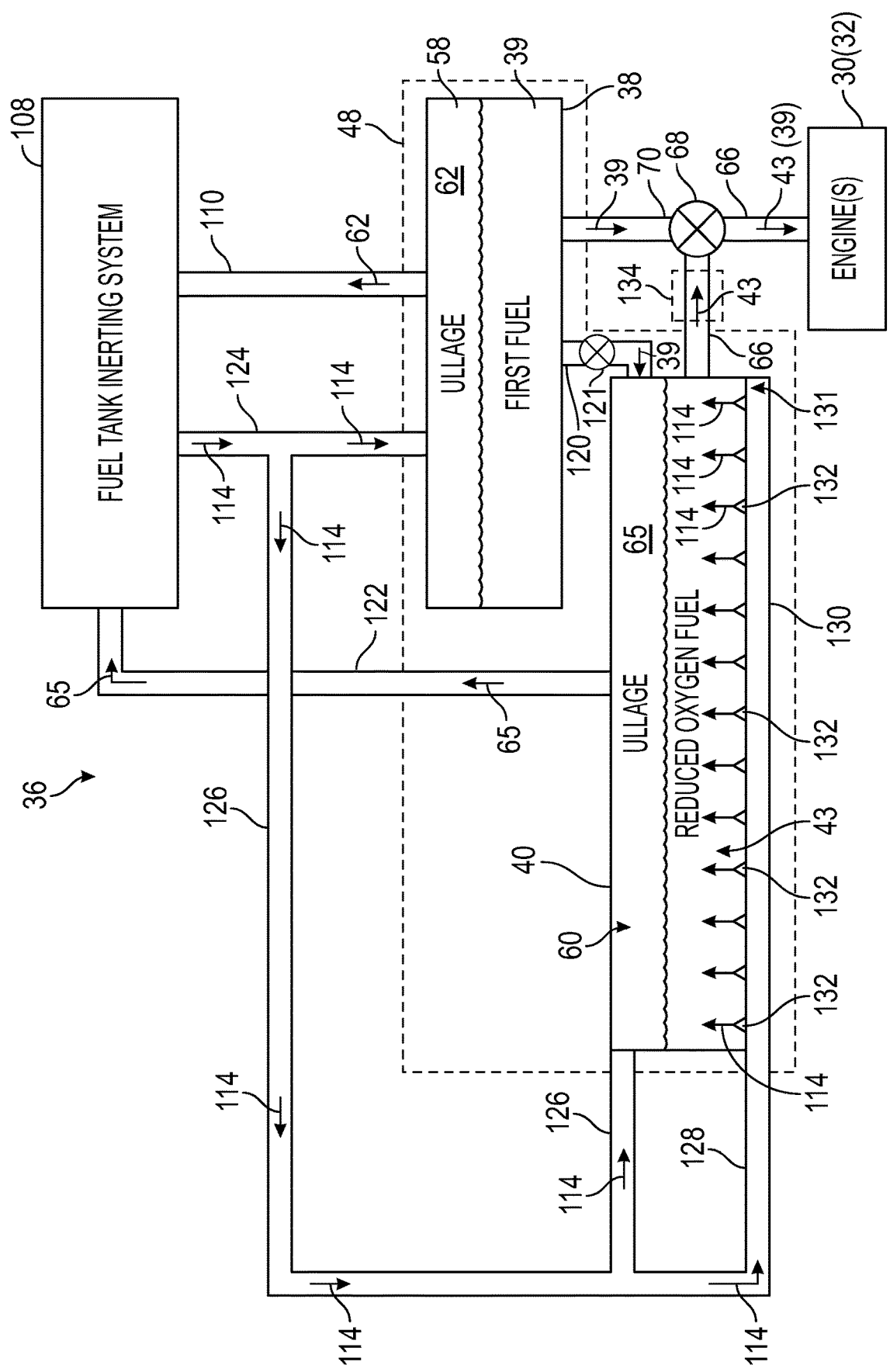
FIG. 7 is a schematic diagram of another alternate arrangement of a fuel system, according to an aspect of the present disclosure.

FIG. 7 is a schematic diagram of another alternate arrangement of a fuel system 36, according to another aspect of the present disclosure. The fuel system 36 in FIG. 7 includes elements that are the same as those described above with regard to FIG. 4 and, therefore, the same elements are labeled accordingly. In the FIG. 7 aspect, however, the fuel oxygen reduction unit 42 may be omitted, and, another arrangement of the fuel tank inerting system 108 and associated reduced oxygen gas supply lines is provided. Similar to the FIG. 4 aspect, the fuel system 36 of FIG. 7 includes the first fuel storage tank 38 and the second fuel storage tank 40, which may be either separate fuel tanks or may be separate portions of a same combined single fuel storage tank 48. The first fuel storage tank 38 stores the first fuel 39, which, again, may be an oxygen rich fuel. The first fuel 39 is provided to the second fuel storage tank 40 via a first fuel supply line 120 that includes a valve 121 and that provides fluid communication between the first fuel storage tank 38 and the second fuel storage tank 40. The second fuel storage tank 40 stores a reduced oxygen fuel 43, which, as will be described in more detail, may be the first fuel 39 provided from the first fuel storage tank 38 to the second fuel storage tank 40 and that is mixed with a reduced oxygen gas within the second fuel storage tank 40 to generate the reduced oxygen fuel 43.

Similar to the FIG. 4 aspect, the fuel system 36 of FIG. 7 includes the fuel tank inerting system 108. In the same manner described above for FIG. 4, the second gas supply line 110 provides the oxygen rich gas 62 from the ullage 58 of the first fuel storage tank 38 to the fuel tank inerting system 108. In a similar manner, a second gas supply line 122 provides an oxygen rich gas 65 from the ullage 60 of the second fuel storage tank 40 to the fuel tank inerting system 108. A first gas return line 124 provides a flow of the reduced oxygen gas 114 from the fuel tank inerting system 108 to the ullage 58 of the first fuel storage tank 38. A second gas return line 126 provides a flow of the reduced oxygen gas 114 to the ullage 60 of the second fuel storage tank 40. The second gas return line 126 may be similar to the second gas supply line 112 (FIG. 4). Alternatively, the second gas return line 126 may be a stand-alone gas return line that is provided to directly connect the fuel tank inerting system 108 with the ullage 60 of the second fuel storage tank 40.

A third gas return line 128 provides a flow of the reduced oxygen gas 114 to a fuel tank sparging system 130. The third gas return line 128 may branch-off of the second gas return line 126 as shown in FIG. 7, or may be a stand-alone gas return line that is provided to directly connect the fuel tank inerting system 108 with the fuel tank sparging system 130. The fuel tank sparging system 130 is arranged at a lower side 131 of the second fuel storage tank 40 and includes a plurality of nozzles 132. The plurality of nozzles 132 inject a flow of the reduced oxygen gas 114 therethrough directly into the fuel stored in the second fuel storage tank 40. The plurality of nozzles 132 may be configured to provide a desired amount of flow of the reduced oxygen gas 114 into the fuel, and may be configured to provide a desired disbursement pattern of the injected reduced oxygen gas 114 within the fuel. As was described above, the first fuel 39 is provided from the first fuel storage tank 38 to the second fuel storage tank 40 via the first fuel supply line 120. Thus, the fuel initially stored in the second fuel storage tank 40 may be the first fuel 39. However, once the fuel tank sparging system 130 injects the reduced oxygen gas 114 into the first fuel 39, the reduced oxygen fuel 43 is generated within the second fuel storage tank 40 due to the mixing of the reduced oxygen gas 114 with the oxygen rich first fuel 39. As a result, the second fuel storage tank 40 stores the reduced oxygen fuel 43 therewithin.

The reduced oxygen fuel 43 is provided via the engine fuel supply line 66 to the valve 68, and then to the engines 30, 32. The engine fuel supply line 66 may optionally include a separator 134. The separator 134 may be similar to the fuel gas separator 80 (FIG. 3) in that it may mechanically separate gas from liquid within the reduced oxygen fuel 43.

For example, in a case when too much of the reduced oxygen gas 114 may be injected into the fuel by the fuel tank sparging system 130 such that foam may be present within the reduced oxygen fuel 43 transferred through the engine fuel supply line 66, the separator 134 may remove excess reduced oxygen gas 114 from the reduced oxygen fuel 43 before providing the reduced oxygen fuel 43 to the engines 30, 32.

Figure 8:
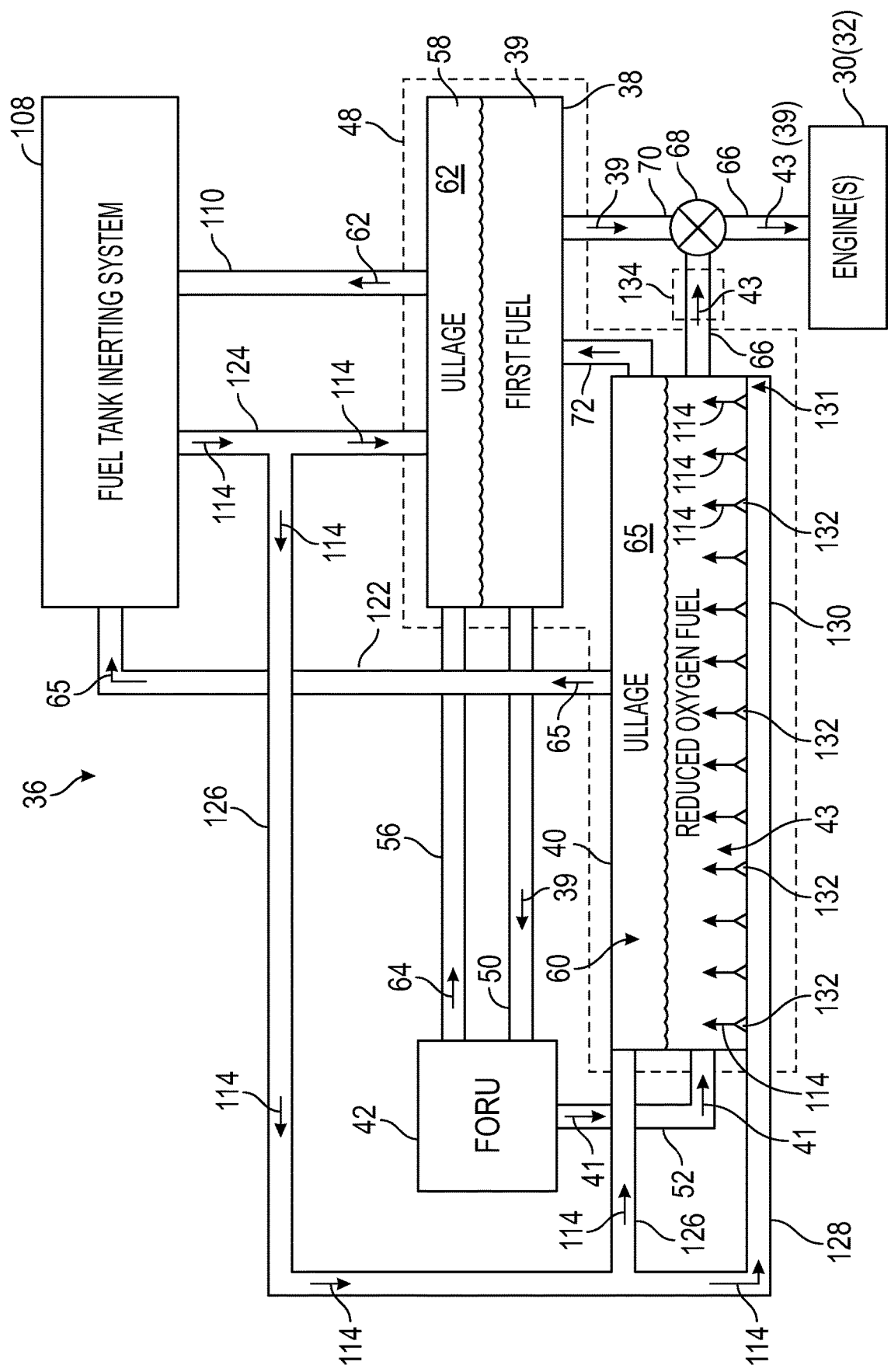
FIG. 8 is a schematic diagram of yet another alternate arrangement of a fuel system, according to an aspect of the present disclosure.

FIG. 8 is a schematic diagram of another alternate arrangement of a fuel system 36, according to another aspect of the present disclosure. The fuel system 36 in FIG. 8 includes elements that are the same as those described above with regard to FIG. 7 and, therefore, the same elements are labeled accordingly. In the FIG. 8 aspect, however, the fuel oxygen reduction unit (FORU) 42 is included in conjunction with the fuel tank inerting system 108. Thus, in the FIG. 8 aspect, rather than providing the first fuel 39 from the first fuel storage tank 38 directly to the second fuel storage tank 40 via the first fuel supply line 120, the first fuel 39 is provided to the fuel oxygen reduction unit 42 via the first fuel supply line 50, and the deoxygenated fuel 41 is provided from the fuel oxygen reduction unit 42 to the second fuel storage tank 40 via the second fuel supply line 52. Similar to the FIG. 4 aspect, the deoxygenated gas 64 is provided from the fuel oxygen reduction unit 42 to the ullage 58 of the first fuel storage tank 38 via the first gas return line 56.

In the FIG. 8 aspect, the fuel tank inerting system 108 and the associated gas supply lines 110, 122, 124, 126, and 128 are the same as those described above for the FIG. 7 aspect. One difference, however, is that, rather than the fuel tank sparging system 130 injecting the reduced oxygen gas 114 into the first fuel 39 within the second fuel storage tank 40, the fuel tank sparging system 130 injects the reduced oxygen gas 114 into the deoxygenated fuel 41 contained within the second fuel storage tank 40. Thus, the injection of the reduced oxygen gas 114 into the deoxygenated fuel 41 may provide a further reduction of the oxygen content within the deoxygenated fuel 41.

With each of the foregoing aspects, a sizing of the second fuel storage tank 40 may be determined based on several considerations. The second fuel storage tank 40 is generally sized to provide a buffer stock of the deoxygenated fuel 41 to the engines 30, 32 in the event of a mismatch between the flow demand of the engines 30, 32 and a rate at which the fuel oxygen reduction unit 42 produces the deoxygenated fuel 41. Some different aspects for controlling the fuel oxygen reduction unit 42 and the second fuel storage tank 40 size may be as follows.

As one aspect, the production rate of the fuel oxygen reduction unit 42 may be made a variable production rate that is matched to the engine demand. This aspect may call for a close integration of the fuel oxygen reduction unit 42 and control of the engines 30, 32. The production rate of the fuel oxygen reduction unit 42 may be controlled by valving, motor speed, or various other means to match the same flow rate demanded by the engines 30, 32. The size of the second fuel storage tank 40 can be minimized with this aspect, thereby covering inaccuracy in steady state and transient production and demand flow monitoring or control.

In another aspect, the production rate of the fuel oxygen reduction unit 42 may be set so as to cover a steady state engine demand. With this aspect, the fuel oxygen reduction unit 42 may be designed to produce the deoxygenated fuel 41 at a constant rate equal to the maximum steady state engine demand. The second fuel storage tank 40 may be sized to cover transient flow demand above or below the production rate of the fuel oxygen reduction unit 42. As was discussed above, the overflow fuel supply line 72 (FIG. 2) may be provided so as to allow for any overflow of the deoxygenated fuel 41 within the second fuel storage tank 40 to flow back to the first fuel storage tank 38. Alternatively, computer logic may be implemented to turn the fuel oxygen reduction unit 42 on and off as needed to cover mismatches in engine demand and the production rate of the fuel oxygen reduction unit 42.

In yet another aspect, the production rate of the fuel oxygen reduction unit 42 may be made constant covering both a steady state and transient engine demand. Here, the fuel oxygen reduction unit 42 may be designed to produce the deoxygenated fuel 41 at a constant rate equal to the maximum steady state plus the transient engine demand. The second fuel storage tank 40 may be sized to cover inaccuracy in the steady state and transient production, and demand flow monitoring or control. Again, the overflow fuel supply line 72 may be provided, or the computer logic to turn the fuel oxygen reduction unit 42 on and off may be implemented to cover mismatches in engine demand and production rate.

In still yet another aspect, the fuel oxygen reduction unit 42 may be designed to include multiple constant production rates covering key steady state engine demand points. Here, the fuel oxygen reduction unit 42 may be designed to produce the deoxygenated fuel 41 at multiple constant rates equal to the steady state engine demand at key cycle conditions. The second fuel storage tank 40 may be sized to cover transient flow demand above or below the production rate of the fuel oxygen reduction unit 42. Again, the overflow fuel supply line 72, or the computer logic to turn the fuel oxygen reduction unit 42 on and off may be implemented to cover mismatches in engine demand and production rate.

While the foregoing description relates generally to a fuel system in a gas turbine engine, the fuel system may be implemented in various other aircraft engines instead. For example, the fuel system is not limited to aircraft and may be implemented in non-aircraft applications, such as power generating stations, marine applications, or oil and gas production applications. Thus, the present disclosure is not limited to use in aircraft.

Further aspects of the present disclosure are provided by the subject matter of the following clauses.

An aircraft fuel system including a first fuel storage tank arranged to store a first fuel, a second fuel storage tank arranged to store a reduced oxygen fuel, and a fuel tank inerting system arranged to provide a reduced oxygen gas through a fuel contained within the second fuel storage tank to generate the reduced oxygen fuel within the second fuel storage tank.

The aircraft fuel system according to the preceding clause, wherein the first fuel storage tank and the second fuel storage tank are separate portions of a same fuel tank.

The aircraft fuel system according to any preceding clause, further comprising a fault accommodation fuel supply line providing fluid communication from the first fuel storage tank to at least one engine.

The aircraft fuel system according to any preceding clause, further comprising a first fuel supply line providing fluid communication from the first fuel storage tank to the second fuel storage tank, wherein the first fuel is provided from the first fuel storage tank to the second fuel storage tank via the first fuel supply line such that the fuel contained within the second fuel storage tank is the first fuel, and the reduced oxygen gas is provided to the first fuel contained within the second fuel storage tank to generate the oxygen reduced fuel.

The aircraft fuel system according to any preceding clause, wherein the second fuel storage tank includes a fuel tank sparging system, the fuel tank sparging system being in airflow communication with the fuel tank inerting system and providing the reduced oxygen gas into the first fuel within the second fuel storage tank.

The aircraft fuel system according to any preceding clause, further comprising a first gas supply line providing a flow of oxygen rich gas from an ullage of the first fuel storage tank to the fuel tank inerting system, and a first gas return line providing a flow of a reduced oxygen gas from the fuel tank inerting system to the ullage of the first fuel storage tank.

The aircraft fuel system according to any preceding clause, further comprising a second gas supply line providing a flow of oxygen rich gas from an ullage of the second fuel storage tank to the fuel tank inerting system, and a second gas return line providing a flow of the reduced oxygen gas from the fuel tank inerting system to the ullage of the second fuel storage tank.

The aircraft fuel system according to any preceding clause, further comprising a third gas return line providing a flow of reduced oxygen gas from the fuel tank inerting system to a fuel tank sparging system, the fuel tank sparging system providing a flow of the reduced oxygen gas into the first fuel stored in the second fuel storage tank to generate the reduced oxygen fuel.

The aircraft fuel system according to any preceding clause, further comprising an engine fuel supply line providing a flow of the reduced oxygen fuel from the second fuel storage tank to at least one engine.

The aircraft fuel system according to any preceding clause, further comprising a separator provided in the engine fuel supply line, the separator arranged to separate reduced oxygen gas from the reduced oxygen fuel flowing through the engine fuel supply line.

The aircraft fuel system according to any preceding clause, further comprising a fuel oxygen reduction unit that generates a deoxygenated fuel from the first fuel stored in the first fuel storage tank and provides the deoxygenated fuel to the second fuel storage tank such that the fuel contained within the second fuel storage tank is the deoxygenated fuel, wherein the second fuel storage tank includes a fuel tank sparging system, the fuel tank sparging system being in airflow communication with the fuel tank inerting system and providing the reduced oxygen gas into the deoxygenated fuel within the second fuel storage tank to generate the reduced oxygen fuel.

The aircraft fuel system according to any preceding clause, further including a first fuel supply line providing a flow of the first fuel from first fuel storage tank to the fuel oxygen reduction unit, and a second fuel supply line providing a flow of the deoxygenated fuel from the fuel oxygen reduction unit to the second fuel storage tank.

The aircraft fuel system according to any preceding clause, further comprising a first gas return line providing a flow of a reduced oxygen gas from the fuel oxygen reduction unit to an ullage of the first fuel storage tank.

An aircraft propulsion system including at least one engine, and a fuel system including (a) a first fuel storage tank arranged to store a first fuel, (b) a second fuel storage tank arranged to store a reduced oxygen fuel, and (c) a fuel tank inerting system arranged to provide a reduced oxygen gas through a fuel contained within the second fuel storage tank to generate the reduced oxygen fuel within the second fuel storage tank.

The aircraft propulsion system according to the preceding clause, further including a first gas supply line providing a flow of an oxygen rich gas from an ullage of the first fuel storage tank to the fuel tank inerting system, a first gas return line providing a flow of a reduced oxygen gas from the fuel tank inerting system to the ullage of the first fuel storage tank, a second gas supply line providing a flow of an oxygen rich gas from an ullage of the second fuel storage tank to the fuel tank inerting system, a second gas return line providing a flow of the reduced oxygen gas from the fuel tank inerting system to the ullage of the second fuel storage tank, and a third gas return line providing a flow of the reduced oxygen gas from the fuel tank inerting system to a fuel tank sparging system, the fuel tank sparging system providing a flow of the reduced oxygen gas into the first fuel stored in the second fuel storage tank to generate the reduced oxygen fuel.

The aircraft propulsion system according to any preceding clause, further including an engine fuel supply line providing a flow of the reduced oxygen fuel from the second fuel storage tank to the at least one engine.

The aircraft propulsion system according to any preceding clause, further comprising a first fuel supply line providing fluid communication from the first fuel storage tank to the second fuel storage tank, wherein the first fuel is provided from the first fuel storage tank to the second fuel storage tank via the first fuel supply line such that the fuel contained within the second fuel storage tank is the first fuel, and the reduced oxygen gas is provided to the first fuel contained within the second fuel storage tank to generate the reduced oxygen fuel.

The aircraft propulsion system according to any preceding clause, wherein the second fuel storage tank includes a fuel tank sparging system, the fuel tank sparging system being in airflow communication with the fuel tank inerting system and providing the reduced oxygen gas into the first fuel within the second fuel storage tank.

The aircraft propulsion system according to any preceding clause, further including a fuel oxygen reduction unit that generates a deoxygenated fuel from the first fuel stored in the first fuel storage tank and provides the deoxygenated fuel to the second fuel storage tank such that the fuel contained within the second fuel storage tank is the deoxygenated fuel, wherein the second fuel storage tank includes a fuel tank sparging system, the fuel tank sparging system being in airflow communication with the fuel tank inerting system and providing the reduced oxygen gas into the deoxygenated fuel within the second fuel storage tank to generate the reduced oxygen fuel.

The aircraft propulsion system according to any preceding clause, further including a first fuel supply line providing a flow of the first fuel from first fuel storage tank to the fuel oxygen reduction unit, a first gas return line providing a flow of a reduced oxygen gas from the fuel oxygen reduction unit to an ullage of the first fuel storage tank, and a second fuel supply line providing a flow of the deoxygenated fuel from the fuel oxygen reduction unit to the second fuel storage tank.

An aircraft fuel system comprises a first fuel storage tank arranged to store a first fuel, a fuel oxygen reduction unit arranged to generate a deoxygenated fuel from the first fuel, and a second fuel storage tank arranged to store the deoxygenated fuel generated by the fuel oxygen reduction unit, and being arranged to supply the deoxygenated fuel to an engine.

The aircraft fuel system according to the preceding clause, the first fuel storage tank and the second fuel storage tank being separate portions of a same fuel tank.

The aircraft fuel system according to any preceding clause, further comprising a first fuel supply line providing fluid communication from the first fuel storage tank to the fuel oxygen reduction unit, and a second fuel supply line providing fluid communication from the fuel oxygen reduction unit to the second fuel storage tank.

The aircraft fuel system according to any preceding clause, further comprising an overflow fuel supply line providing fluid communication from the second fuel storage tank to the first fuel storage tank, the overflow fuel supply line providing an overflow return of the deoxygenated fuel from the second fuel storage tank to the first fuel storage tank.

The aircraft fuel system according to any preceding clause, further comprising a fault accommodation fuel supply line providing fluid communication from the first fuel storage tank to the engine, the fault accommodation fuel supply line providing the first fuel from the first fuel storage tank to the engine when a fault is detected in the aircraft fuel system.

The aircraft fuel system according to any preceding clause, further comprising a first gas supply line providing airflow communication from an ullage of the first fuel storage tank to the fuel oxygen reduction unit, and a first gas return line providing an airflow communication from the fuel oxygen reduction unit to the ullage of the first fuel storage tank.

The aircraft fuel system according to any preceding clause, the first gas return line further providing airflow communication from the fuel oxygen reduction unit to an ullage of the second fuel storage tank.

The aircraft fuel system according to any preceding clause, the first fuel supply line providing the first fuel to the fuel oxygen reduction unit, the second fuel supply line provides the deoxygenated fuel to the second fuel storage tank, the first gas supply line provides an oxygen rich gas from the ullage of the first fuel storage tank to the fuel oxygen reduction unit, and the first gas return line provides a reduced oxygen gas to the ullage of the first fuel storage tank.

The aircraft fuel system according to any preceding clause, the first fuel supply line providing the first fuel from the first fuel storage tank to the fuel oxygen reduction unit, the second fuel supply line provides the deoxygenated fuel to the second fuel storage tank, the first gas supply line provides an oxygen rich gas from the ullage of the first fuel storage tank to the fuel oxygen reduction unit, and the first gas return line provides a reduced oxygen gas to the ullage of the first fuel storage tank and to the ullage of the second fuel storage tank.

The aircraft fuel system according to any preceding clause, further comprises a fuel tank inerting system, a second gas supply line providing airflow communication from the ullage of the first fuel storage tank to the fuel tank inerting system, and a second gas return line providing airflow communication from the fuel tank inerting system to the ullage of the first fuel storage tank, and to an ullage of the second fuel storage tank.

The aircraft fuel system according to any preceding clause, the second gas supply line providing an oxygen rich gas from the ullage of the first fuel storage tank to the fuel tank inerting system, and the second gas return line provides an oxygen reduced gas to the ullage of the first fuel storage tank and to the ullage of the second fuel storage tank.

The aircraft fuel system according to any preceding clause, the first gas supply line providing an oxygen rich gas from the ullage of the first fuel storage tank to the fuel oxygen reduction unit, and the first gas return line provides a reduced oxygen gas from the fuel oxygen reduction unit to the ullage of the first fuel storage tank.

The aircraft fuel system according to any preceding clause, further comprises a first gas return line providing airflow communication from the fuel oxygen reduction unit to an ullage of the first fuel storage tank, a fuel tank inerting system, a first gas supply line providing airflow communication from the ullage of the first fuel storage tank to the fuel tank inerting system, and a second gas return line providing airflow communication from the fuel tank inerting system to the ullage of the first fuel storage tank, to the fuel oxygen reduction unit, and to an ullage of the second fuel storage tank.

The aircraft fuel system according to any preceding clause, the first gas supply line providing an oxygen rich gas from the ullage of the first fuel storage tank to the fuel tank inerting system, and the second gas return line provides a reduced oxygen gas from the fuel tank inerting system to the ullage of the first fuel storage tank, to the fuel oxygen reduction unit, and to the ullage of the second fuel storage tank.

The aircraft fuel system according to any preceding clause, the first gas return line providing an oxygen rich gas from the fuel oxygen reduction unit to the ullage of the first fuel storage tank.

The aircraft fuel system according to any preceding clause, wherein the fuel oxygen reduction unit includes a heat exchanger, a first catalyst, a contactor, a separator, and a second catalyst.

The aircraft fuel system according to any preceding clause further including an ullage pump providing an oxygen rich gas to the first catalyst, and a fuel pump providing the first fuel from the first fuel storage tank to the contactor.

The aircraft fuel system according to any preceding clause, wherein the separator provides the deoxygenated fuel to the second fuel storage tank and provides an oxygen rich gas to the second catalyst, the second catalyst providing an oxygen reduced gas to the ullage of the first fuel storage tank.

The aircraft fuel system according to any preceding clause further comprising a fuel tank inerting system, and wherein the fuel oxygen reduction unit includes a contactor and a separator.

The aircraft fuel system according to any preceding clause further including a fuel pump providing the first fuel to the contactor, wherein the fuel tank inerting system provides an oxygen reduced gas to the contactor, and the separator provides the deoxygenated fuel to the second fuel storage tank and provides a reduced oxygen gas to the ullage of the first fuel storage tank.

The aircraft fuel system according to any preceding clause, wherein at least one of the first gas supply line and the first gas return line includes a flame arrestor at the first fuel storage tank.

The aircraft fuel system according to any preceding clause, further including at least one valve controlling a flow of the deoxygenated fuel from the second fuel storage tank to at least one engine, and controlling a flow of the first fuel from the first fuel storage tank to the at least one engine in the case where a failure occurs with the supply of the deoxygenated fuel from the second fuel storage tank to the at least one engine.

An aircraft propulsion system comprises at least one engine, and a fuel system including (a) a first fuel storage tank arranged to store a first fuel, (b) a fuel oxygen reduction unit arranged to generate a deoxygenated fuel from the first fuel, and (c) a second fuel storage tank arranged to store the deoxygenated fuel generated by the fuel oxygen reduction unit, and being arranged to supply the deoxygenated fuel to the at least one engine.

The aircraft propulsion system according to any preceding clause, the fuel system further including (d) a first fuel supply line providing fluid communication from the first fuel storage tank to the fuel oxygen reduction unit, (e) a second fuel supply line providing fluid communication from the fuel oxygen reduction unit to the second fuel storage tank, (f) a fuel tank inerting system, (g) a first gas supply line providing airflow communication from the fuel oxygen reduction unit to an ullage of the first fuel storage tank, (h) a first gas supply line providing airflow communication from the ullage of the first fuel storage tank and the fuel tank inerting system, and (i) a second gas return line providing airflow communication from the fuel tank inerting system to the ullage of the first fuel storage tank, to the fuel oxygen reduction unit, and to an ullage of the second fuel storage tank.

The aircraft propulsion system according to any preceding clause, the fuel system further including (d) a first fuel supply line providing fluid communication from the first fuel storage tank to the fuel oxygen reduction unit, (e) a second fuel supply line providing fluid communication from the fuel oxygen reduction unit to the second fuel storage tank, (f) a first gas supply line providing airflow communication from an ullage of the first fuel storage tank to the fuel oxygen reduction unit, and (g) a first gas return line providing an airflow communication from the fuel oxygen reduction unit to the ullage of the first fuel storage tank.

The aircraft propulsion system according to any preceding clause, (i) the first fuel supply line providing the first fuel from the ullage of the first fuel storage tank to the fuel oxygen reduction unit, (ii) the second fuel supply line provides the deoxygenated fuel from the fuel oxygen reduction unit to the second fuel storage tank, (iii) the first gas supply line provides an oxygen rich gas from the ullage of the first fuel storage tank to the fuel oxygen reduction unit, and (iv) the first gas return line provides a reduced oxygen gas from the fuel oxygen reduction unit to the ullage of the first fuel storage tank.

The aircraft propulsion system according to any preceding clause, further comprising (d) a fuel tank inerting system, (e) a second gas supply line providing airflow communication from the ullage of the first fuel storage tank to the fuel tank inerting system, and (f) a second gas return line providing airflow communication from the fuel tank inerting system to the ullage of the first fuel storage tank and to an ullage of the second fuel storage tank.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. An aircraft propulsion system comprising:
at least one engine; and
a fuel system including (a) a first fuel storage tank arranged to store a first fuel, (b) a second fuel storage tank arranged to store a reduced oxygen fuel, (c) a fuel tank inerting system arranged to provide a reduced oxygen gas through a fuel contained within the second fuel storage tank to generate the reduced oxygen fuel within the second fuel storage tank, and (d) a fuel oxygen reduction unit that generates a deoxygenated fuel from the first fuel stored in the first fuel storage tank and provides the deoxygenated fuel to the second fuel storage tank such that the fuel contained within the second fuel storage tank is the deoxygenated fuel,
wherein the second fuel storage tank includes a fuel tank sparging system, the fuel tank sparging system being in airflow communication with the fuel tank inerting system and providing the reduced oxygen gas into the deoxygenated fuel within the second fuel storage tank to generate the reduced oxygen fuel.

2. The aircraft propulsion system according to claim 1, further comprising:
a first fuel supply line providing a flow of the first fuel from first fuel storage tank to the fuel oxygen reduction unit;
a first gas return line providing a flow of a reduced oxygen gas from the fuel oxygen reduction unit to an ullage of the first fuel storage tank; and
a second fuel supply line providing a flow of the deoxygenated fuel from the fuel oxygen reduction unit to the second fuel storage tank.

3. An aircraft fuel system comprising:
a first fuel storage tank arranged to store a first fuel;
a second fuel storage tank arranged to store a reduced oxygen fuel;
a fuel tank inerting system arranged to provide a reduced oxygen gas through a fuel contained within the second fuel storage tank to generate the reduced oxygen fuel within the second fuel storage tank; and
a fuel oxygen reduction unit that generates a deoxygenated fuel from the first fuel stored in the first fuel storage tank and provides the deoxygenated fuel to the second fuel storage tank such that the fuel contained within the second fuel storage tank is the deoxygenated fuel,
wherein the second fuel storage tank includes a fuel tank sparging system, the fuel tank sparging system being in airflow communication with the fuel tank inerting system and providing the reduced oxygen gas into the deoxygenated fuel within the second fuel storage tank to generate the reduced oxygen fuel.

4. The aircraft fuel system according to claim 3, further comprising:
a first fuel supply line providing a flow of the first fuel from first fuel storage tank to the fuel oxygen reduction unit; and
a second fuel supply line providing a flow of the deoxygenated fuel from the fuel oxygen reduction unit to the second fuel storage tank.

5. The aircraft fuel system according to claim 4, further comprising a first gas return line providing a flow of a reduced oxygen gas from the fuel oxygen reduction unit to an ullage of the first fuel storage tank.

6. An aircraft fuel system comprising:
a first fuel storage tank arranged to store a first fuel;
a second fuel storage tank arranged to store a reduced oxygen fuel;
a fuel tank inerting system arranged to provide a reduced oxygen gas through a fuel contained within the second fuel storage tank to generate the reduced oxygen fuel within the second fuel storage tank;

a first gas supply line providing a flow of oxygen rich gas from an ullage of the first fuel storage tank to the fuel tank inerting system, and a first gas return line providing a flow of the reduced oxygen gas from the fuel tank inerting system to the ullage of the first fuel storage tank;

a second gas supply line providing a flow of oxygen rich gas from an ullage of the second fuel storage tank to the fuel tank inerting system, and a second gas return line providing a flow of the reduced oxygen gas from the fuel tank inerting system to the ullage of the second fuel storage tank; and a third gas return line providing a flow of the reduced oxygen gas from the fuel tank inerting system to a fuel tank sparging system in the second fuel storage tank, the fuel tank sparging system providing a flow of the reduced oxygen gas into the first fuel stored in the second fuel storage tank to generate the reduced oxygen fuel.

7. The aircraft fuel system according to claim 6, wherein the first fuel storage tank and the second fuel storage tank are separate portions of a same fuel tank.

8. The aircraft fuel system according to claim 6, further comprising a fault accommodation fuel supply line providing fluid communication from the first fuel storage tank to at least one engine.

9. The aircraft fuel system according to claim 6, further comprising a first fuel supply line providing fluid communication from the first fuel storage tank to the second fuel storage tank, wherein the first fuel is provided from the first fuel storage tank to the second fuel storage tank via the first fuel supply line such that the fuel contained within the second fuel storage tank is the first fuel, and the reduced oxygen gas is provided to the first fuel contained within the second fuel storage tank to generate the oxygen reduced fuel.

10. The aircraft fuel system according to claim 9, wherein the fuel tank sparging system is in airflow communication with the fuel tank inerting system and provides the reduced oxygen gas into the first fuel within the second fuel storage tank.

11. The aircraft fuel system according to claim 6, further comprising an engine fuel supply line providing a flow of the reduced oxygen fuel from the second fuel storage tank to at least one engine.

12. The aircraft fuel system according to claim 11, further comprising a separator provided in the engine fuel supply line, the separator arranged to separate reduced oxygen gas from the reduced oxygen fuel flowing through the engine fuel supply line.

13. An aircraft propulsion system comprising:
at least one engine; and
a fuel system including (a) a first fuel storage tank arranged to store a first fuel, (b) a second fuel storage tank arranged to store a reduced oxygen fuel, (c) a fuel tank inerting system arranged to provide a reduced oxygen gas through a fuel contained within the second fuel storage tank to generate the reduced oxygen fuel within the second fuel storage tank, (d) a first gas supply line providing a flow of an oxygen rich gas from an ullage of the first fuel storage tank to the fuel tank inerting system, (e) a first gas return line providing a flow of the reduced oxygen gas from the fuel tank inerting system to the ullage of the first fuel storage tank, (f) a second gas supply line providing a flow of an oxygen rich gas from an ullage of the second fuel storage tank to the fuel tank inerting system, (g) a second gas return line providing a flow of the reduced oxygen gas from the fuel tank inerting system to the ullage of the second fuel storage tank, and (h) a third gas return line providing a flow of the reduced oxygen gas from the fuel tank inerting system to a fuel tank sparging system, the fuel tank sparging system providing a flow of the reduced oxygen gas into the first fuel stored in the second fuel storage tank to generate the reduced oxygen fuel.

14. The aircraft propulsion system according to claim 13, further comprising an engine fuel supply line providing a flow of the reduced oxygen fuel from the second fuel storage tank to the at least one engine.

15. The aircraft propulsion system according to claim 13, further comprising a first fuel supply line providing fluid communication from the first fuel storage tank to the second fuel storage tank, wherein the first fuel is provided from the first fuel storage tank to the second fuel storage tank via the first fuel supply line such that the fuel contained within the second fuel storage tank is the first fuel, and the reduced oxygen gas is provided to the first fuel contained within the second fuel storage tank to generate the reduced oxygen fuel.

16. The aircraft propulsion system according to claim 15, wherein the fuel tank sparging system is in airflow communication with the fuel tank inerting system and provides the reduced oxygen gas into the first fuel within the second fuel storage tank.

* * * * *